March 14, 1967　　　G. E. BROOMHALL　　　3,309,599
REGULATED POWER SUPPLY
Filed Oct. 22, 1963
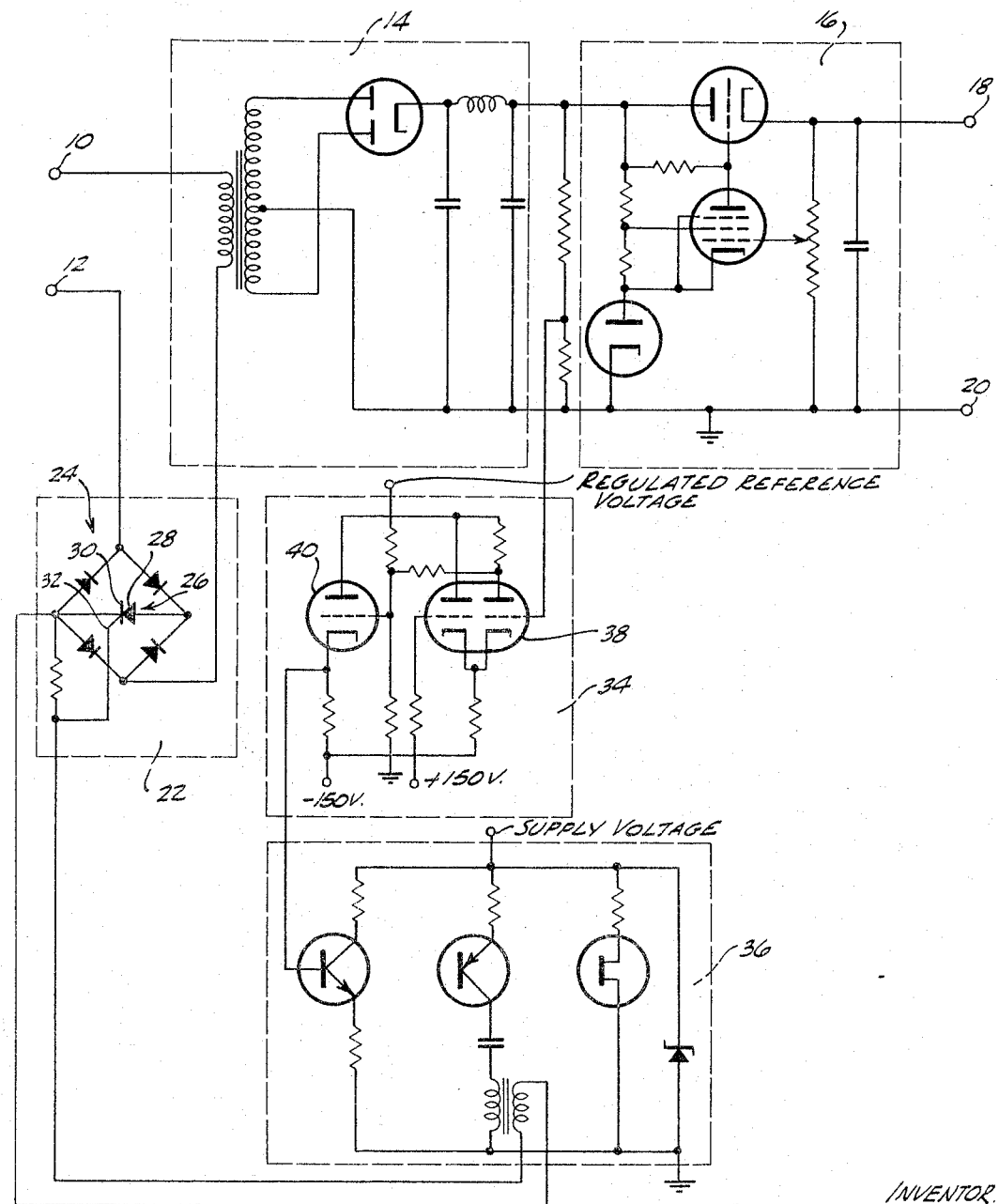
INVENTOR.
GORDON E. BROOMHALL,
BY Walter R. Thiel
ATTORNEY.

United States Patent Office 3,309,599
Patented Mar. 14, 1967

3,309,599
REGULATED POWER SUPPLY
Gordon E. Broomhall, Escondido, Calif., assignor to Hughes Aircraft Company, Culver City, Calif., a corporation of Delaware
Filed Oct. 22, 1963, Ser. No. 317,880
1 Claim. (Cl. 321—24)

The present invention relates to regulated power supplies and more particularly to a regulated power supply having a phase controlled switch circuit to control the input voltage to a power supply circuit.

It is oftentimes desirable to control the voltage supplied from a source to a load circuit to within predetermined levels irrespective of variations in the source voltage and the impedance of the load circuit. Where the power to be supplied to a load circuit is obtained from a source having poor regulation, it is common to employ a voltage regulator between the source and the load circuit to maintain the voltage at the load circuit substantially constant.

Since the direct current voltage available from the rectifier-filter circuit of a conventional prior art regulated power supply must be somewhat higher than the maximum required output voltage, the regulator must be capable of dissipating the difference between the maximum direct current voltage and whatever particular output voltage is required. For example, in a high voltage supply such as 0–10 kv. power supply, the output voltage of the rectifier-filter circuit may be in the order of 12,500 volts; therefore, when the required output voltage is in the order of 500 volts, the voltage drop across the electron discharge tubes of a conventional series regulator is approximately 12,000 volts, which will exceed the voltage capability of most conventional tubes. If, in addition, an output current of 5 ma. is required, the resulting dissipation of the series regulator would be 60 watts. Because of the limitations of presently available electronic components, a series regulator which would operate under these conditions would not operate satisfactorily when required to pass 5 ma. of current with only a 2 or 3 kv. drop across it.

One way to solve this problem is to mechanically gang a variable transformer to the variable voltage control of a conventional regulating circuit in such a way that the difference between the rectifier-filter circuit voltage and the output voltage is maintained at a relatively constant value. Thus the regulating circuit is required to handle a much smaller range of voltage; however, it must still be capable of compensating for line voltage variations and variations in the internal impedance of the rectifier-filter circuit.

Therefore, an object of this invention is to provide an improved regulated power supply circuit.

Another object of this invention is to provide an improved regulated power supply which automatically compensates for fluctuations in the line voltage.

A further object of this invention is to provide an improved regulated power supply which includes a control circuit between the rectifier-filter circuit and the source to compensate for fluctuations in the line voltage.

The above enumerated objects are accomplished according to a preferred embodiment of this invention in an improved power supply which includes in combination with a conventional regulated power supply, having a rectifier-filter circuit and a regulating circuit, a phase controlled switch circuit including a controlled rectifier and a diode bridge circuit connected between the rectifier-filter circuit and an A.C. source. A control circuit is coupled between the output terminal of the rectifier-filter circuit and the switch circuit to sense the output voltage and to develop a gating pulse to trigger the controlled rectifier when the output signal differs from a predetermined magnitude.

Other advantages of the invention will hereinafter become more fully apparent from the following description of the drawing the single figure of which illustrates a schematic drawing of the present invention illustrating a preferred embodiment.

Referring now to the drawing there is shown a pair of input terminals 10, 12 which are coupled through a rectifier-filter circuit 14 and a regulating circuit 16 to a pair of output terminals 18, 20. Typically, the input terminals 10, 12 are connected to a source of voltage such as an alternating current line voltage and the output terminals are connected to a load circuit. The arrangement of the rectifier-filter circuit 14 and the regulating circuit 16 may be a conventional arrangement as shown of electron discharge devices, resistors and capacitors and is fully described in Electronic and Radio Engineering, fourth edition, at pp. 725–727. Other rectifier-filter arrangements may be employed to satisfy appropriate power, voltage or current requirements without departing from the scope of this invention.

To control the voltage applied from the input terminals 10, 12 to the rectifier-filter circuit 14 an electronic switch circuit 22 is connected in series therebetween. The switch circuit 22 includes a diode bridge arrangement 24 and a semiconductor controlled rectifier 26 such as a silicon controlled rectifier having a cathode 28, an anode 30 connected between opposite terminals or points of the diode bridge 24, and a gate 32 adapted to receive a control signal or pulse when the output voltage of the rectifier-filter circuit 14 varies from a predetermined magnitude.

To provide this control signal, a control circuit including an amplifier-comparator circuit 34 and a timing circuit 36 is connected between the gate 32 and the output side of the rectifier-filter circuit 14. Typically, the amplifier-comparator circuit 34 includes a pair of triode electric discharge devices illustrated as a dual triode 38 connected as a differential amplifier and a cathode follower amplifier 40. So that the dual triode 38 will operate as a differential amplifier to produce a differential signal when the output voltage of the rectifier-filter circuit varies from a fixed reference voltage, the grid of one of the dual triodes is connected through a suitable resistor to a reference potential such as 150 v. and the grid of the other dual triode is connected through a suitable resistor to one of the output leads of the rectifier-filter circuit 14. This differential signal is supplied to the timing circuit 36 which typically may be a unijunction transistor timing circuit such as the circuit depicted in FIG. 7.7, page 89, General Electric Control Rectifier Manual, 1960.

To summarize the operation of the control circuit, variations in the voltage output of the rectifier-filter circuit appear as an unbalance to the differential amplifier which causes an amplified signal to trigger the timing circuit to develop a pulse sufficient to delay the point in the A.C. cycle of the input voltage at which the controlled rectifier switches from its blocking to its conducting state. In this way variations in the output voltage of the rectifier-filter circuit 24, due to variations in the line voltage or of the internal impedance of the rectifier-filter circuit 24, will appear as an error signal to the timing circuit and will pulse the switching circuit 22 at such a time to vary the magnitude of the input voltage applied to the rectifier-filter circuit 24.

Although the switching circuit 22 has been described and depicted to include a diode bridge-controlled rectifier arrangement it should be understood that other electronic phase controlled switching circuits may be substituted therefor within the scope of this invention.

While one embodiment of this invention has been herein illustrated it should be appreciated by those skilled in the art that variations of the disclosed arrangement both as to its details and as to the organization of such details may be made to develop a regulated power supply having a voltage output of a polarity opposite from that herein described without departing from the spirit and scope thereof. Accordingly, it is intended that the foregoing disclosure and the showings made in the drawings may be considered as illustrative of the principles of this invention and not construed in a limiting sense.

What is claimed is:

A voltage regulator comprising:

a pair of terminals adapted to be coupled to a source of alternating current voltage;

an electronic rectifier-filter circuit for rectifying said alternating current voltage to provide a direct current operating voltage;

a pair of terminals adapted to be coupled to an output circuit;

an electronic regulating circuit coupled between said rectifier-filter circuit and said output circuit for maintaining the voltage supplied to said output circuit substantially constant;

a phase controlled switch circuit coupled between said source and said rectifier-filter circuit, said circuit including a diode bridge circuit and a controlled rectifier connected between opposite terminals of said bridge circuit, said controlled rectifier having a cathode, anode, and gate; and a control circuit means connected to said rectifier-filter circuit and said gate for triggering said controlled rectifier when the magnitude of the voltage of said source varies from a predetermined value, said circuit including a plurality of triode electron discharge devices coupled as a differential amplifier and a cathode follower amplifier and a unijunction timing circuit coupled to said cathode follower amplifier to receive the amplified signal from said differential amplifier and to develop a pulse sufficient to switch said controlled rectifier from its blocking to its conducting state.

References Cited by the Examiner

UNITED STATES PATENTS

| 3,068,392 | 12/1962 | Santelmann | 321—18 |
| 3,221,241 | 11/1965 | Greenberg et al. | 321—18 |
| 3,244,965 | 4/1966 | Gutzwiller | 321—18 |

OTHER REFERENCES

"Electronics," Mar. 9, 1962, pp. 62–64.

JOHN F. COUCH, *Primary Examiner.*

M. WACHTELL, *Assistant Examiner.*